Feb. 11, 1958  B. F. ARPS ET AL  2,822,628
TRACTOR SCRAPER BLADE ADJUSTMENT ASSEMBLAGE
Filed July 25, 1955  5 Sheets-Sheet 1

INVENTORS
Bruno F. Arps &
Calvin O. Schmahl,
BY
Morsell & Morsell
ATTORNEYS.

Feb. 11, 1958 B. F. ARPS ET AL 2,822,628
TRACTOR SCRAPER BLADE ADJUSTMENT ASSEMBLAGE
Filed July 25, 1955 5 Sheets-Sheet 2

INVENTORS
Bruno F. Arps +
Calvin O. Schmahl,
BY
Morsell & Morsell
ATTORNEYS.

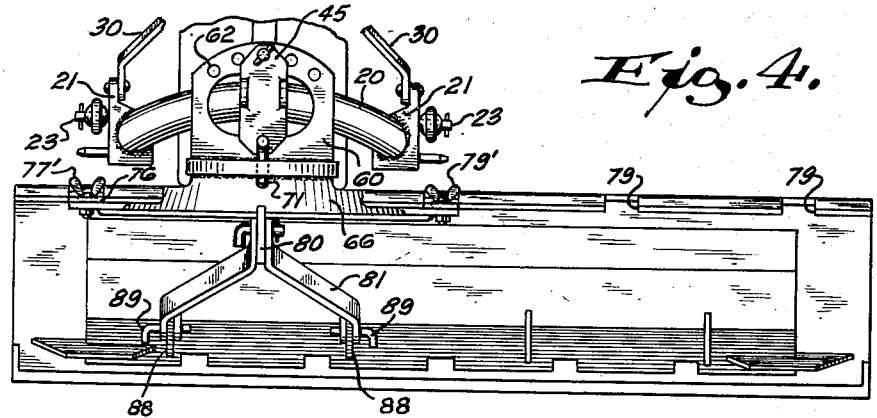
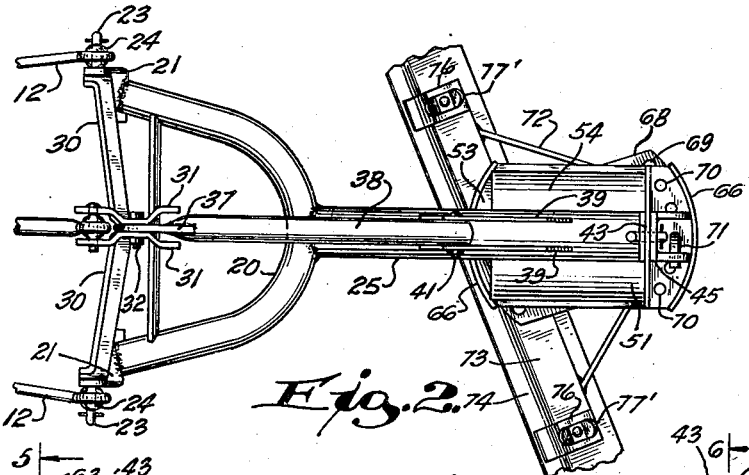
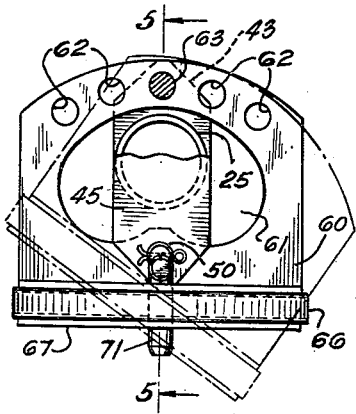
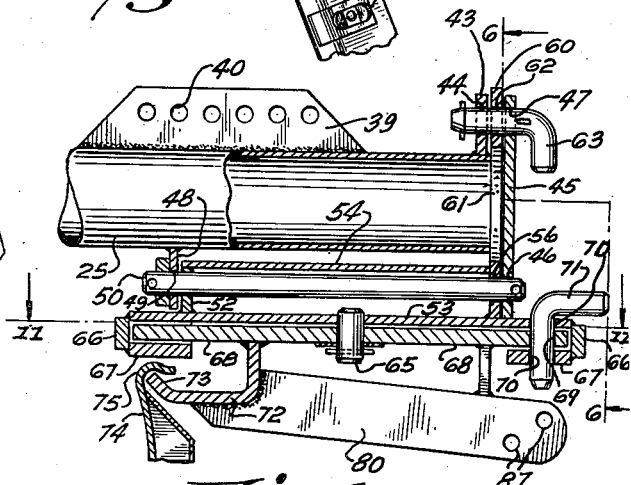

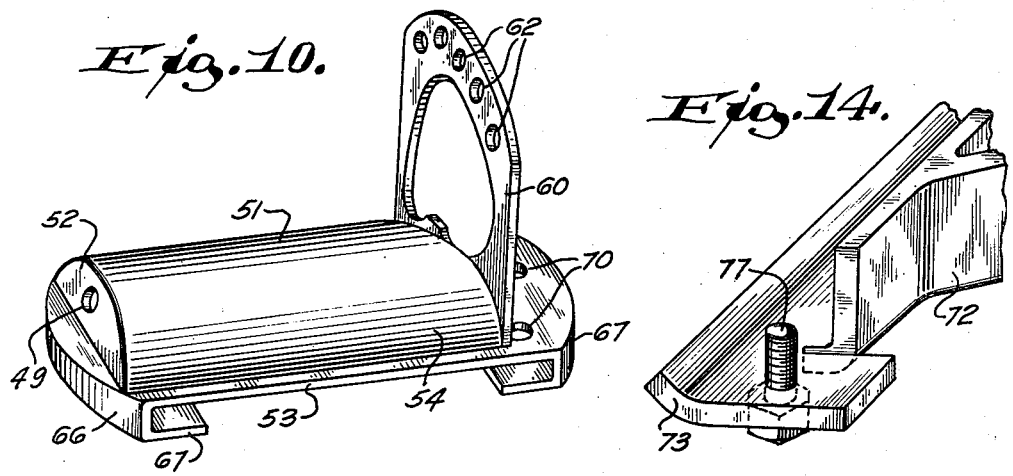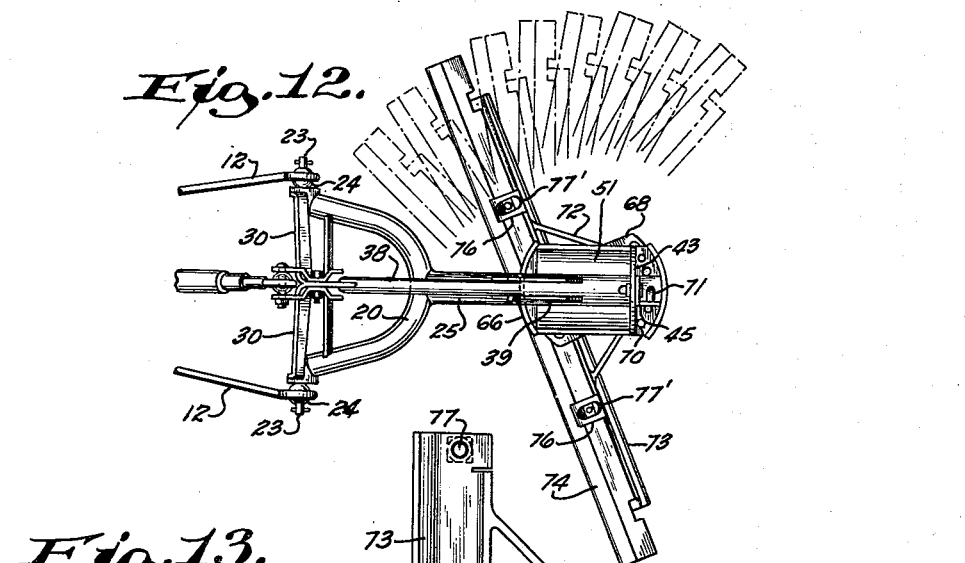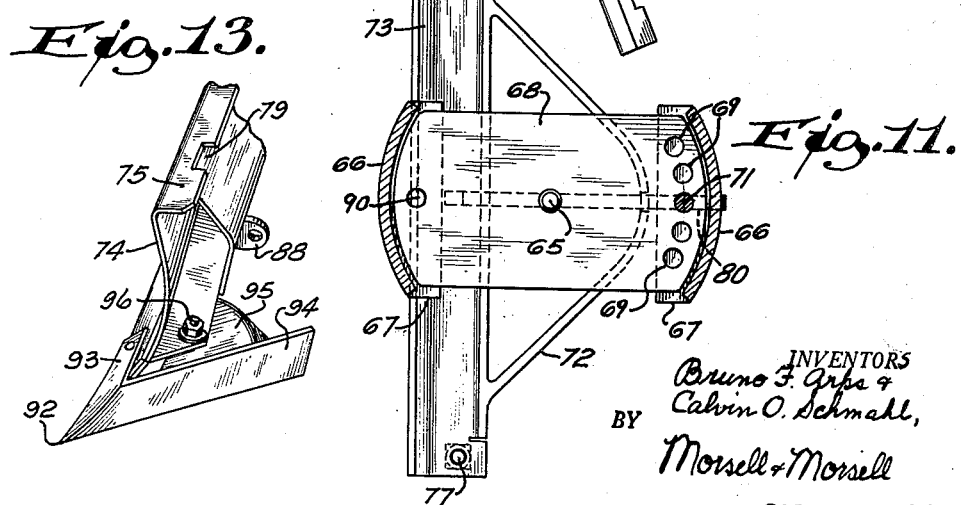

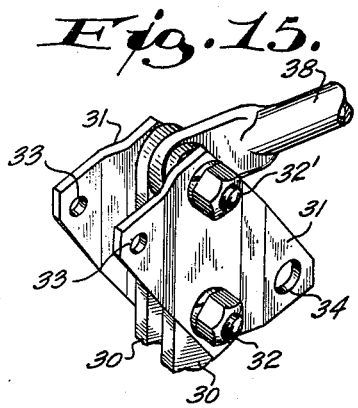
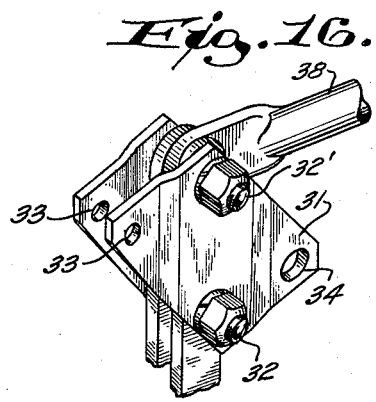
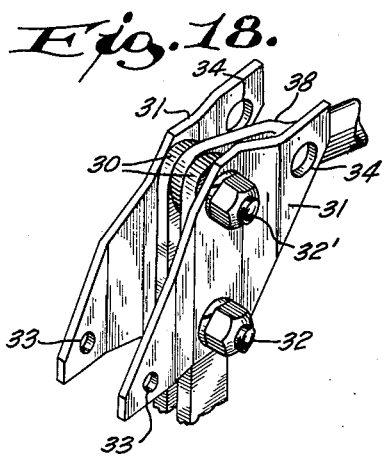
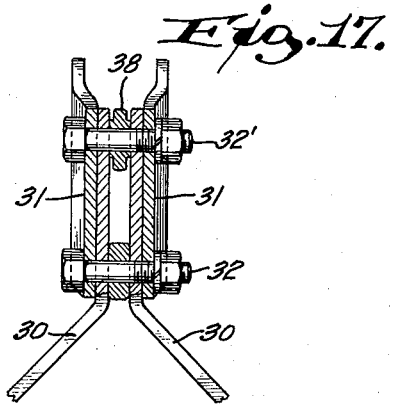
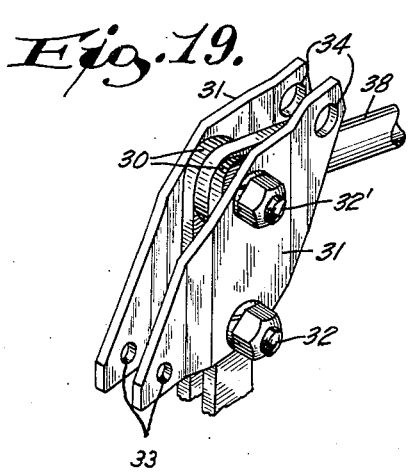
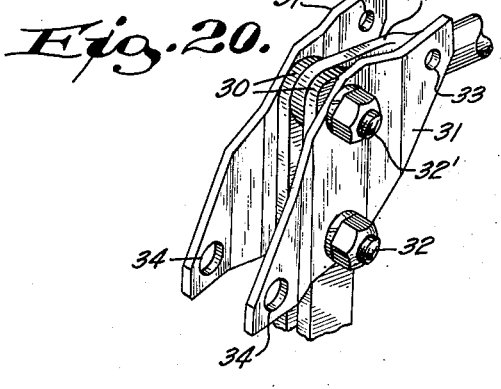

2,822,628

Patented Feb. 11, 1958

2,822,628

TRACTOR SCRAPER BLADE ADJUSTMENT ASSEMBLAGE

Bruno F. Arps, New Holstein, and Calvin O. Schmahl, Chilton, Wis., assignors to Arps Corporation, New Holstein, Wis., a corporation of Wisconsin Application July 25, 1955, Serial No. 524,240

9 Claims. (Cl. 37—159)

This invention relates to tractors having a scraper blade attached thereto and is particularly concerned with the adjusting means therefor.

When utilizing a scraper blade on a tractor, it is customary to provide a large number of adjustments for the blade to handle the various types of surfaces and slopes encountered.

It is an object of the present invention to provide a novel and useful improvement in the scraper blade adjusting means.

Another object of the present invention is to provide for angling, pitch, transverse, tilt and leveling adjustments of a tractor scraper blade with a minimum of operating parts.

A further object of the present invention is to provide a plurality of adjustments for a tractor scraper blade requiring but a minimum of locking means.

Another object of the present invention is to provide tilting and angling adjustments of a tractor scraper blade using common coacting parts.

Still another object of the subject invention is to provide a rotatable part attached to a tractor scraper blade allowing the scraper blade to be used for pushing or pulling material.

A further object of the invention is to provide in an assemblage of the character described, means for adapting the scraper blade assembly to various tractors whose means for implement attachment are of the "three-point hitch" type, but whose points for attachment may have dimensional variations one from another.

Additional objects within the purview of the present invention will be apparent from the following description when read in connection with the drawings, in which:

Fig. 2 is a top view of the adjustment mechanism showing the scraper blade in an adjusted angle position;

Fig. 4 is a rear view of the tractor and the adjustment mechanism showing the scraper blade in a laterally adjusted position;

Fig. 5 is an enlarged sectional view taken along line 5—5 of Fig. 6 illustrating the adjustment mechanism associating the scraper blade with the tractor frame;

Fig. 6 is an enlarged rearward view of the upright projecting member of the housing element in the adjustment mechanism with another position of the member shown in dotted lines;

Fig. 10 is an enlarged perspective view of the housing element;

Fig. 11 is a sectional view taken along line 11—11 of Fig. 5 illustrating the turntable construction of the scraper blade;

Fig. 12 is a top view of the adjustment mechanism similar to Fig. 2 and illustrating by dotted lines the various angling adjustments of the scraper blade;

Fig. 13 is a perspective view of one end of the scraper blade illustrating the ditching point mounted thereon;

Fig. 14 is a fragmentary perspective view showing an attachment of the turntable connecting bar with the upturned edge support upon which the scraper blade rests;

Figs. 15, 16, 18, 19 and 20 are fragmentary perspective views showing the reversible bar mounting plates in various positions of adjustment; and Fig. 17 is a fragmentary vertical sectional view through the plates in one position of adjustment.

Figure 1:
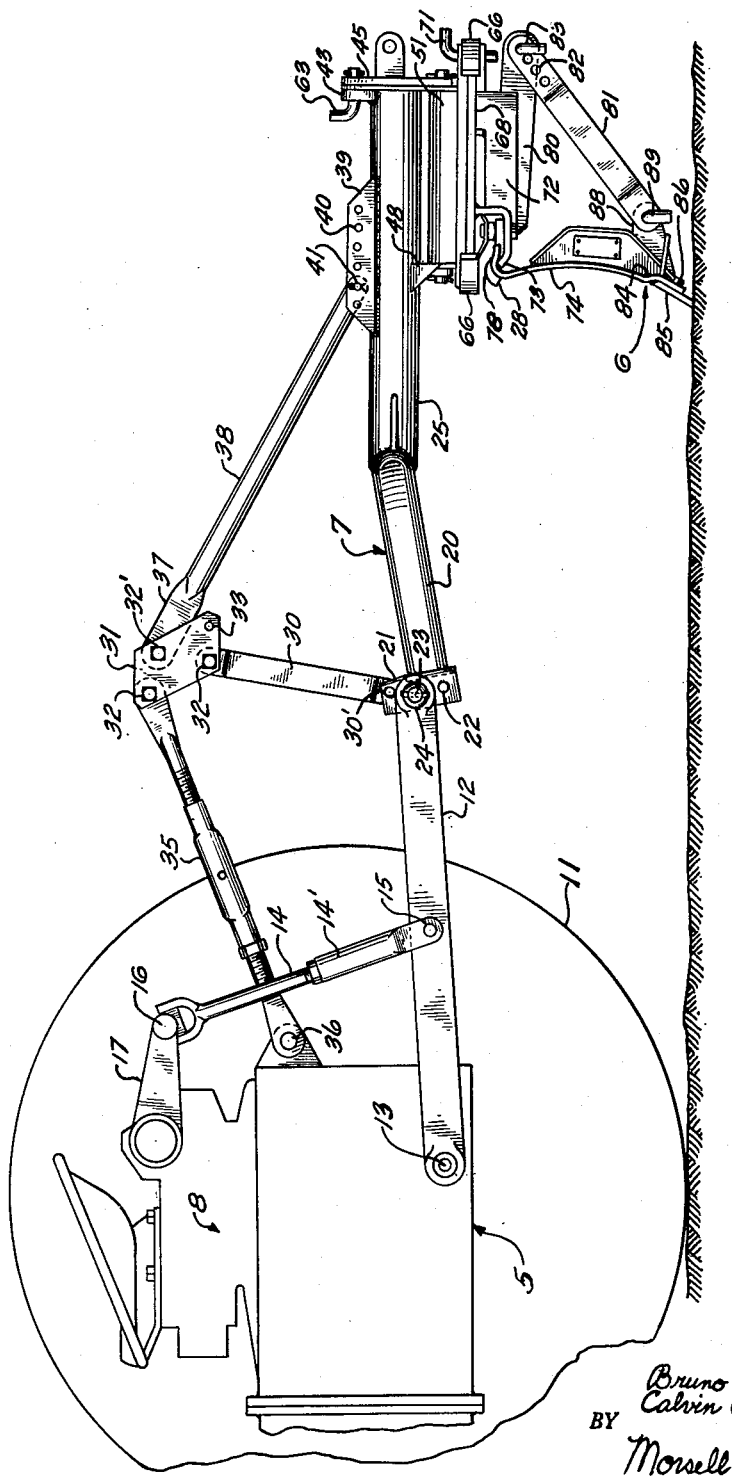
Fig. 1 is a side elevational view of part of a tractor having attached thereto a scraper blade incorporating the adjustment mechanism.

Referring now to the characters of reference on the drawings, Fig. 1 shows a tractor wherein its main portion is designated by the numeral 5 and the frame unit connecting the scraper assembly 6 to the tractor is designated by the numeral 7. A tractor power lift 8 is shown on the rear part of tractor 5 and since the portion 8 is conventional, the details thereof will not be described except to say that it is the usual type of hydraulic lift found on tractors, but the same includes or has associated therewith certain elements known as a "three point hitch" which will be described hereinafter and to which the scraper blade frame is attached. Rear driving wheels 11 are mounted on tractor 5 and are driven in the usual manner by the tractor engine (not shown) and a transmission (not shown).

Said "three point hitch" includes a drawbar 12 having two members attached on either side of the tractor 5 in lower pivot mountings 13 and extending rearwardly therefrom. Also included are a pair of upper lift arms 17 which are connected with the power lift 8, one on each side of tractor 5. Links 14 connect drawbar 12 with lift arms 17 at pivot mountings 15 and 16, respectively. Link 14 is adjustable, having a part 14' within which another part of link 14 can be turned to lengthen or shorten link 14 to thereby raise or lower the frame unit 7 a limited distance. It should be understood that for raising frame unit 7 and scraper assembly off the ground, lift 8 supplies the motive force.

Frame unit 7 includes a U-shaped or yoke member 20 with brackets 21 mounted on the forward ends thereof. Pins 22 mounted in the lower portions of the brackets 21 are for optional use with different size holes in the ends of the drawbars of certain tractors, 12, the pins 22 being of different length and diameter than the pins 23 ordinarily used in the mountings 24. Two upwardly converging bars 30 are connected at their lower ends to brackets 21 by pivot connections 30'. The upper ends of bars 30 are selectively attached to a pair of closely positioned reversible plates by bolts 32 selectively engageable with desired holes in the plates 31, according to the positions of said plates, as shown in Figs. 15 to 20 inclusive. Plates 31 include openings 33 and 34 of different sizes. Turnbuckle links 35 which are a part of the tractor "three point hitch" are employed as shown in Fig. 1. As the links 35 vary in length, the position of the pivotal connection 36 therefor may vary on different tractor makes and there also may be differences in the sizes of the pivot pin openings. Also the present invention permits adjustments of the plates 31 to compensate for yoke width requirements for fitting the adjacent end of a link 35 between the plates 31. Thus, the plates 31 may be secured to the bars 30 by bolts 32 and 32' in any one of six different combinations and further permitting use of pins of several different diameters currently used in tractor assemblage for securing a link 35 between the plates 31, as selectively adjusted. Fig. 15 shows said plates with the small holes 33 uppermost and a relatively wide space between the plates. Fig. 16 is similar to Fig. 15 only with a relatively narrow space between the plates. Figs. 18 and 19 show the plates arranged with the small holes 33 downwardly and with wide and narrow spaces, respectively, between the plates, while Fig. 20 shows the plates with the large holes 34 downwardly and a relatively wide space between the plates. In Fig. 1 there is a relatively wide space between the plates 31, but the plates are positioned so that their large holes are upward. With different make tractors the hitch point position and the size of the pin and yoke openings may vary. Through rearrangement of the plates 31, as illustrated in Figs. 15 to 20 inclusive the improved scraper blade adjustment assemblage is adaptable to or will fit various makes of tractors.

Between plates 31, and fastened by bolts 32', is the flattened end 37 of a tubular member 38. From Fig. 17 it will be evident that the flattened end of the member 38 is formed with lateral spacer portions which keep said member movable. Yoke 20 has fastened, as by welding, at its rearward midportion, a rearwardly extending longitudinal tubular member 25. On the upper part of tubular member 25, as shown in Fig. 2, are mounted, as by welding, a pair of closely spaced brackets 39. Formed in brackets 39 are a number of spaced openings 40, and the rear end of member 38 can be selectively fastened thereon with a bolt or pin 41. The selective attachment of bar 38 to brackets 39 allows frame members 20 and 25 a pivotal adjustment about pivot mountings 24 relative to arm 12 for leveling the frame member 25, and subsequently turntable 68 (to be described) in relation to the ground line.

Figure 9:
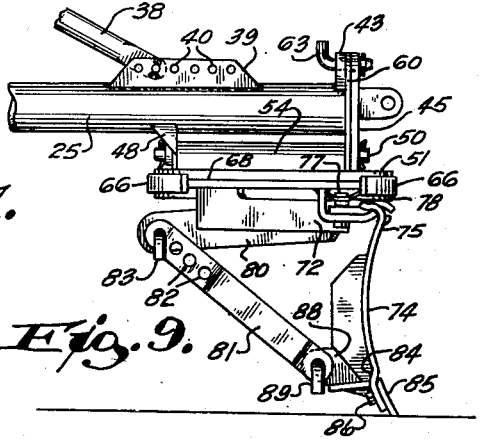
Fig. 9 is a side elevational view of the adjustment mechanism with the turntable and scraper blade reversed for bull-dozing operations.

An end bracket 45 is fastened to the rear end of member 25. Bracket 45 has portions extending both above and below member 25, and said upper and lower portions having openings 47 and 46, respectively, as shown in Fig. 5. Positioned adjacent to but forwardly of bracket 45 and fastened to the top of tubular member 25, as by welding, is a bracket 43, which is shown in Figs. 5 and 9. Bracket 43 includes an opening 44 aligned longitudinally with opening 47 in bracket 45.

Depending from member 25 and oppositely positioned from brackets 39 is a bracket 48 which includes an opening 49 aligned longitudinally with opening 46 in bracket 45. Stub shaft 50 is journaled in openings 46 and 49 for rotational movement therein. Cotter pins are passed through the ends of shaft 50 to prevent longitudinal movement, as shown in Fig. 9.

Figure 3:
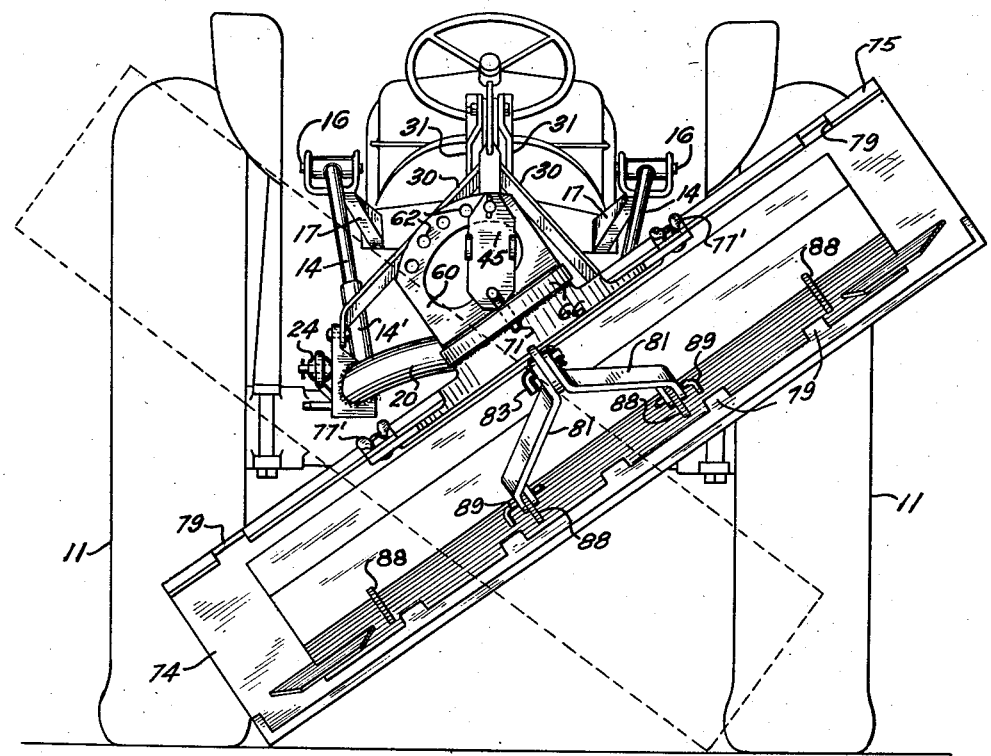
Fig. 3 is a rear view of the tractor and the adjustment mechanism showing the scraper blade in an adjusted tilted position with another tilted position of the scraper blade shown by dotted lines.

Substantially all of stub shaft 50 is enclosed within a housing element 51, which is shown in Fig. 10. Housing 51 includes a base portion 53 and a transverse curved section 52 projecting upwardly from the front end of base 53. A curved surface 54 has its ends fastened, as by welding, to the longitudinal sides of base 53 and has a sufficient curvature so that the forward end of shaft 50 can be fitted through opening 49 in section 52 and enclosed between curved surface 54 and base 53. The rearward end of shaft 50 passes through opening 56 in a projecting member 60. Projection 60 abuts the rear end of curved surface 54 and is positioned between brackets 43 and 45. Projecting bracket 60 has a large opening 61 (see Fig. 6) formed therein which is large enough for tube 25 to pass through but not large enough for bracket 45 to pass through. That part of projection 60 which is between the edge of opening 61 and the edge of bracket 60 has a number of openings 62 formed therein corresponding in radius with openings 44 and 47. A pin 63 or other locking means can pass through corresponding openings 44, 62 and 47 to lock bracket 60 with housing 51 in a number of selected tilted positions as shown in Figs. 3 and 6.

Base portion 53 has depending horizontal lip sections 67 at its front and rear parts. The underturned lip sections 67 are attached as by welding to base 53 by depending curved strips 66.

Centrally positioned in base 53 is a pivot pin 65 and mounted thereon in depending relationship is a turntable plate 68 which has curved edges formed so as to be slidingly rotatable within lip sections 67 and base sections 53. Adjacent the rearward curved surface of turntable 68 are formed a number of openings 69. Openings 69 may be formed in one group of three closely spaced openings, as shown in Fig. 11, and corresponding in radius to this group of three openings but spaced farther apart than openings 69 are openings 70 formed in base 53 and rear lip section 67. Openings 70 may be three in number, as shown in Fig. 2, and by use of a pin 71 or other locking means at least nine selected positions of angling adjustment of turntable 68 can be attained, as illustrated by the broken lines in Fig. 12.

As shown in Figs. 1 and 5 turntable 68 has fastened thereunder a bar 72 connecting the turntable to scraper blade 74. Bar or brace 72 is fastened to the rearward portion of turntable 68 and diverges forwardly with its forward ends 73 being upturned (see Fig. 14) to provide a support for scraper blade 74.

Figure 7:
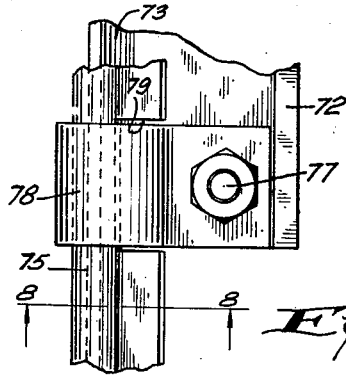
Fig. 7 is an enlarged top view illustrating the clamping means for the scraper blade.
Figure 8:
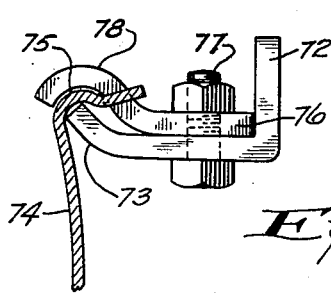
Fig. 8 is a sectional end view taken along line 8—8 of Fig. 7.

The means for locking blade 74 to upturned edge 73 is more clearly shown in Figs. 7 and 8. Blade 74 has a turned-back substantially perpendicular upper edge 75 which fits over end 73. As shown in Figs. 3 and 4, edge 75 has a number of notches 79 formed therein, and clamp members 76, having upwardly curved parts 78 to fit over edges 75, can be selectively fitted into these notches to clamp edges 73 and 75 together with locking means, such as bolts 77 shown in Fig. 8 or wing nuts 77' shown in Figs. 3 and 4.

A support member 80 is fastened under the forward section of turntable 68 and extends longitudinally downwardly and rearwardly. A pair of brace members 81 are connected at their lower ends to brackets 88 projecting from the lower part of blade 74 by fastening means, such as pins 89, and converge upwardly and rearwardly. The upward ends of brace members 81 have a plurality of spaced openings 82 formed therein, and corresponding openings 87 are formed in the rearward end of longitudinal member 80. Locking means, such as pin 83, can be used to selectively lock members 80 and 81 together through openings 82 and 87 for pitch adjustment of blade 74.

It will be observed in Figs. 1 and 9 that scraper blade 74 has a rearwardly offset part 84 at its lower edge to which a reinforced cutting strip 85 is attached, as by bolts 86.

The adjustment operations of the subject mechanism comprise tilting, angling, pitch and sideways adjustments.

The tilt adjustment operation is performed by removing pin 63. Scraper blade 74 is then tilted to the desired position wherein openings 43 and 47 also are aligned with one of openings 62, whereupon pin 63 is inserted through these openings, and the desired tilted position of blade 74 is locked in place.

The angle adjustment operation is performed by removing pin 71. Scraper blade 74 is then angled to a desired position, a number of which are shown in Fig. 12, wherein one of openings 70 is aligned with one of openings 69, whereupon pin 71 is inserted through these openings, and the blade 74 is locked in the desired angled position.

The pitch adjustment operation is performed by removing pin 83. Scraper blade 74 is then set at the desired pitch wherein one of the openings 82 is aligned with one of the openings 87, whereupon pin 83 is inserted through these openings and the blade 74 is locked in place in the selected position of pitch adjustment. It should be particularly noted that the pitch adjustment can be made without loosening bolts 77 or clamp members 76. The curved edge 78 of clamp 76 is fitted over the curved edge 75 of scraper blade 74 so that changing the pitch angle by rotating lower edge 84 allows a sliding action of these curved edges 75 and 78, although members 76 and 73 are locked together by bolts 77.

The sideways adjustment operation is performed by completely removing bolts 77 and clamps 76. Pins 89 are also removed and scraper blade 74 is slid to the desired position, such as shown in Fig. 4, wherein braces 81 abut an adjacent pair of four spaced-apart brackets 88 (see Figs. 3 and 4) and clamps 78 can be seated on edge 73 and fitted into notches 79. Pins 89 and bolts 77 are then used to lock the abutting parts in place in the desired sideways or lateral adjustment. It should be pointed out that when the sideways or lateral adjustment is made, scraper blade 74 has its downward weight component absorbed by edge 73 and transmitted thereby back to frame 7. Transfer of this weight component allows scraper blade 74 to be easily moved for adjustment.

The subject invention also allows the scraper blade to be reversed and used for bulldozing as shown in Fig. 9. This operation can be performed by removing pin 71 when the turntable 68 is in the position shown in Fig. 11, rotating turntable 68 and the attached scraper 180° until opening 90 is aligned with one of the openings 70, preferably the center opening, and inserting pin 71 to lock turntable 68 in place. Opening 90 is on the same radius from pivot pin 65 as the openings 69 so no difficulty is encountered in aligning openings 70 and 90.

When scraper blade 74 is used for a ditching operation, it is helpful to attach a ditching point 92, as shown in Fig. 13, on one end to prevent slipping of the blade. Ditching point 92 has a flat member 93 fastened forwardly of the lower strip 85 at one end of blade 74. Member 93 extends beyond blade 74 and has attached to the extended end thereof a rearwardly projecting flat portion 94. Portion 94 forms an acute angle with member 93 with respect to the blade 74, and portion 94 is attached to blade 74 by an integral bracket 95 and bolt 96.

It should be understood that locking means for the various adjustments can be supplied by various devices well known in the art, and it is not intended to limit the invention to the embodiments shown.

The particular embodiments of the invention illustrated and described herein are illustrative only. The invention includes such other modifications and equivalents as may readily occur to those skilled in the art within the scope of the appended claims.

What we claim as the invention is:

1. In a scraper attachment for a tractor having a power lift, a frame unit, a longitudinal tubular member formed with projections attached to the frame unit, a scraper blade, connecting means adjustably associating said frame unit and said scraper blade, a drawbar unit pivotally attached to and extending rearwardly from said tractor and having an operating connection with said power lift, a yoke member having its ends pivotally connected to said drawbar unit, said longitudinal tubular member being permanently attached midway of said yoke member and extending rearwardly therefrom, a bracket part positioned on the upper side of said tubular member between the ends thereof, upwardly converging elements pivotally attached at their lower ends to the ends of said yoke member, plate members attached to the upper ends of said converging elements, a first adjustable means forming part of the hitch and connecting said plate members to said tractor, a second adjustable means connecting said plate members and said bracket part and adapted for selective securement to said bracket part; said connecting means comprising a longitudinally extending stub shaft rotatably mounted in the projections of said member attached to the frame unit, a housing element enclosing said shaft, said scraper blade being operatively connected with said housing element for tilting adjustment about said shaft, a rotatable part attached to said scraper blade and pivotally depending from said housing element to provide angling adjustment of said scraper blade about the pivotal mounting of said rotatable part, and pitch adjusting means connecting said scraper blade to said rotatable element.

2. In a scraper attachment for a tractor having a power lift and a hitch, the combination of a rearwardly extending frame unit operatively associated with said hitch, a scraper blade, connecting means adjustably associating said scraper blade with said frame unit, said connecting means comprising a longitudinally extending stub shaft rotatably mounted on the lower side of said frame unit; a housing element operatively associated with said scraper blade and including a base portion having a front and rear curved edge turned under said base portion to form lip sections, a housing portion attached to the upper side of said base portion and curved so as to enclose said stub shaft between said housing portion and said base portion, a member mounted rearwardly of said housing portion and projecting upwardly from said base portion, said member being adapted to be selectively positioned and secured with respect to said frame unit to afford a tilting adjustment of said scraper blade about said stub shaft; a turntable part attached to said scraper blade, said part pivotally depending from said base portion and having curved end portions adapted to rotate within said lip and base sections to provide angling adjustment of said scraper blade, and pitch adjusting means connecting said scraper blade to said turntable part.

3. In a scraper attachment for a tractor having a power lift and a hitch, the combination of a rearwardly extending frame unit operatively associated with said hitch; said frame unit having a longitudinal tubular member pivotally mounted on said tractor, a first bracket member attached at the rearward end of and having portions extending both above and below said tubular member, a second bracket member remotely positioned from said first bracket member and depending from said tubular member; a scraper blade, connecting means adjustably associating said scraper blade with said tubular member, said connecting means comprising a longitudinally extending stub shaft operatively journaled in said first and second bracket members, a housing element enclosing said shaft; said housing element having an upwardly extending member with an opening formed therein of a size to allow the passage therethrough of said tubular member but preventing passage therethrough of said extending portions of said bracket, one of said extending portions being selectively securable to said upwardly extending member for tilting adjustment of said scraper blade about said stub shaft, a turntable part attached to said scraper blade, said turntable part pivotally depending from said housing element to provide angling adjustment of said scraper blade, and pitch adjusting means connecting said scraper blade to said turntable part.

4. In a scraper attachment for a tractor having a power lift and a hitch, the combination of a rearwardly extending frame unit operatively associated with said hitch; said frame unit having a longitudinal tubular member pivotally mounted on said tractor, a first bracket member attached at the rear end of and having portions extending both above and below said tubular member, a second bracket member remotely positioned from said first bracket member and depending from said tubular member; a scraper blade, connecting means adjustably associating said scraper blade with said tubular member, said connecting means comprising a longitudinally extending stub shaft operatively journaled in said first and second bracket members, a housing element enclosing said shaft; said housing element having an upwardly extending member with an opening formed therein of a size to allow the passage therethrough of said tubular member but preventing the passage therethrough of said extending portions of said bracket, one of said extending portions being securable to said upwardly extending member for tilting adjustment of said scraper blade about said stub shaft; a pivot pin centrally mounted in the lower portion of said housing element, a turntable part rotatably mounted on said pivot pin in depending relationship therewith, said turntable part being selectively positionable to provide angling adjustment of said scraper blade about said pivot pin, and pitch adjusting means connecting said scraper blade to said turntable part.

5. In a scraper attachment for a tractor having a power lift and a hitch, the combination of a rearwardly extending frame unit operatively associated with said hitch, a scraper blade, connecting means adjustably associating said scraper blade with said frame unit, said connecting means comprising a longitudinally extending stub shaft rotatably mounted on the lower side of said frame; a housing element operatively associated with said scraper blade and including a base portion having front and rear curved edges turned under said base portion to form lip sections, said rear lip section and base portion having a plurality of openings formed therein spaced radially equidistant from said curved edge, a housing portion attached to the upper side of said base portion and curved so as to enclose said stub shaft between said housing portion and said base portion, a member mounted rearwardly of said housing portion and projecting upwardly from said base portion, said member being adapted to be selectively secured with respect to said frame unit to afford a tilting adjustment of said scraper blade about said stub shaft; a turntable part attached to said scraper blade, said turntable part pivotally depending from said base portion and having curved end portions adapted to rotate within said lip sections, one of said curved end portions having a plurality of closely positioned openings radially spaced to correspond with said plurality of openings in said lip section, means insertable in registering turntable and lip section openings to selectively lock said turntable and said housing element in a plurality of separate angling adjustments of said scraper blade for each one of said base portion openings; and pitch adjusting means connecting said scraper blade to said turntable part.

6. In a scraper attachment for a tractor having a power lift and a hitch, the combination of a rearwardly extending frame unit operatively associated with said hitch and having a member attached thereto having projections, a scraper blade, connecting means adjustably associating said scraper blade with said frame unit, said connecting means comprising a longitudinally extending stub shaft rotatably mounted in said projections of the member attached to said frame unit, a housing element enclosing said shaft, said scraper blade being operatively connected with said housing element for tilting adjustment about said shaft, a turntable pivotally depending from said housing element, a connecting bar attached at one end to said turntable and selectively attached at the other end to said scraper blade to thereby transmit rotative action of said turntable part about its pivot point into angling adjustment of said scraper blade, and pitch adjusting means connecting said scraper blade to said turntable.

7. In a scraper attachment for a tractor having a power lift and a hitch, the combination of a rearwardly extending frame unit operatively associated with said power hitch, said frame unit having projections, a scraper blade, connecting means adjustably associating said scraper blade with said frame unit, said connecting means comprising a longitudinally extending stub shaft rotatably mounted in said frame unit projections, a housing element enclosing said shaft, said scraper blade being operatively connected with said housing element for tilting adjustment about said shaft, a turntable part pivotally depending from said housing element; a diverging bar unit connecting said turntable part with said scraper blade, said bar unit having a diverging brace attached at its top portion to the lower side of said turntable part and diverging outwardly parallel to said turntable part, said brace including upturned end portions to engage the top edge of said scraper blade and means to selectively lock said scraper blade and said bar unit so that rotative action of said turntable is transmitted into angling adjustment of said scraper blade, and pitch adjusting means connecting said scraper blade to said turntable.

8. In a scraper attachment for a tractor having a power lift and a hitch, the combination of a rearwardly extending frame unit operatively associated with said hitch, said frame unit having projections, a scraper blade, connecting means adjustably associating said scraper blade with said frame unit, said connecting means comprising a longitudinally extending stub shaft rotatably mounted in said projections, a housing element enclosing said shaft, said scraper blade being operatively connected with said housing element for tilting adjustment about said shaft, a turntable part pivotally depending from said housing element; a diverging bar unit connecting said turntable part with said scraper blade, said bar unit having a diverging brace attached at its top portion to the lower side of said turntable part and diverging outwardly parallel to said turntable part, said brace including upturned end portions to engage the top edge of said scraper blade, said scraper blade having its top edge turned back substantially perpendicular to said scraper blade and having a plurality of notches spaced along said turned back edge, a clamp member adapted to fit in selected notches in said scraper blade whereby rotative action of said turntable is transmitted into angling adjustment of said scraper blade, and pitch adjusting means connecting said scraper blade to said diverging bar unit.

9. In a scraper attachment for a tractor having a power lift and a hitch, the combination of a rearwardly extending frame unit operatively associated with said hitch and having projections attached thereto, a scraper blade, connecting means adjustably associating said scraper blade with said frame unit, said connecting means comprising a longitudinally extending stub shaft rotatably mounted in said projections, a housing element enclosing said shaft, said scraper blade being operatively connected with said housing element for tilting adjustment about said shaft, a turntable part attached to said scraper blade and pivotally depending from said housing element to provide angling adjustment of said scraper blade, a longitudinal member attached to the lower side of said turntable and projecting rearwardly thereof, said member having an opening formed in its rearward end, and a pair of brace members, each having one end thereof remotely positioned from each other and selectively fastened to the lower edge of said scraper blade and converging upwardly therefrom, the other ends of said brace members having a plurality of openings formed therein corresponding to said opening in said longitudinal member, said longitudinal member and brace member being securable in a selected position of pitch adjustment.

References Cited in the file of this patent
UNITED STATES PATENTS

| | | |
|---|---|---|
| 1,540,161 | Callison et al. | June 2, 1925 |
| 2,560,711 | Arps | July 17, 1951 |
| 2,710,467 | Cundiff | June 14, 1955 |
| 2,723,472 | Bartlett | Nov. 15, 1955 |
| 2,732,639 | Lillengreen | Jan. 31, 1956 |
| 2,740,214 | Collins | Apr. 3, 1956 |